United States Patent
Haugg et al.

(10) Patent No.: US 10,788,126 B2
(45) Date of Patent: Sep. 29, 2020

(54) ACTUATION ARRANGEMENT

(71) Applicant: ZF Friedrichshafen AG, Friedrichshafen (DE)

(72) Inventors: Armin Haugg, Friedrichshafen (DE); Thilo Schmidt, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 170 days.

(21) Appl. No.: 16/021,698

(22) Filed: Jun. 28, 2018

(65) Prior Publication Data
US 2019/0003589 A1    Jan. 3, 2019

(30) Foreign Application Priority Data

Jun. 29, 2017   (DE) .......................... 10 2017 211 025

(51) Int. Cl.
*F16H 63/34*    (2006.01)
*F16H 63/48*    (2006.01)

(52) U.S. Cl.
CPC ..... *F16H 63/3483* (2013.01); *F16H 63/3416* (2013.01); *F16H 63/3475* (2013.01); *F16H 63/483* (2013.01)

(58) Field of Classification Search
CPC ... F16H 63/34–3491; F16H 63/48–483; F16D 2048/0257–0296
See application file for complete search history.

(56) References Cited

U.S. PATENT DOCUMENTS

| | | | |
|---|---|---|---|
| 8,915,344 B2 * | 12/2014 | Schuller | F16D 25/14 192/3.58 |
| 8,931,612 B2 * | 1/2015 | Bauer | F16H 63/3483 192/219.5 |
| 9,261,188 B2 | 2/2016 | Ruehle et al. | |
| 9,689,434 B2 | 6/2017 | Baraga et al. | |

FOREIGN PATENT DOCUMENTS

| | | | |
|---|---|---|---|
| DE | 4322523 A1 * | 1/1995 | ......... F16H 63/3483 |
| DE | 102011109376 A1 | 2/2013 | |
| DE | 102012016235 A1 | 2/2014 | |
| DE | 102015107362 A1 | 11/2016 | |

OTHER PUBLICATIONS

German Search Report DE102017211025.2 dated Mar. 27, 2018. (12 pages).

\* cited by examiner

*Primary Examiner* — David R Morris
*Assistant Examiner* — James J Taylor, II
(74) *Attorney, Agent, or Firm* — Dority & Manning, P.A.

(57) ABSTRACT

An actuation arrangement (23) including an actuating device for actuating a transmission parking lock (1). The actuating device having a piston (2) movable into an engaged position (E), which engages the transmission parking lock (1), and into a disengaged position (A), which disengages the transmission parking lock (1). The actuating device further has a cylinder (3) including a cavity (4), in which the piston (2) is arranged and into which transmission oil is supplied to move the piston (2), and a locking unit (5) configured for selectively fixing the piston (2). The actuation arrangement further includes a valve (13). When the valve (13) is in a first valve position, transmission oil is supplied to the transmission shift element (12) through a first line (14), to actuate the transmission shift element (12), and into the cavity (4)

(Continued)

through the second line (15), to actuate the transmission parking lock (1).

14 Claims, 2 Drawing Sheets

ACTUATION ARRANGEMENT

FIELD OF THE INVENTION

The invention relates generally to an actuation arrangement including an actuating device for actuating a transmission parking lock, a piston movable into an engaged position, in which the transmission parking lock locks or engages, and into a disengaged position, in which the transmission parking lock does not lock or is disengaged, further including a cylinder having a cavity in which the piston is arranged and into which transmission oil is suppliable in order to move the piston, a locking unit which fixes the piston either in the engaged position or in the disengaged position, a transmission shift element, a valve, a first line fluidically connecting the transmission shift element and the valve to each other, wherein transmission oil is suppliable to the transmission shift element through the first line when the valve is in a first valve position in order to actuate the transmission shift element, and a second line which is fluidically connected to the first line and by which the transmission oil is suppliable into the cavity.

The invention also relates generally to a transmission having this type of actuation arrangement. In addition, the invention relates generally to a motor vehicle including the actuation arrangement or the transmission having the actuation arrangement.

BACKGROUND

The use of transmission parking locks, for example, in motor vehicles, is known from the prior art. The transmission parking lock is utilized, in the actuated condition, for preventing the motor vehicle from unintentionally rolling away. In this case, the transmission parking lock can be designed, for example, such that, in the actuated condition, the transmission parking lock prevents an output shaft of the transmission from rotating and, therefore, prevents the vehicle from rolling away.

The actuation of the transmission parking lock takes place by an actuating device which can be, for example, an integral part of a transmission hydraulic system. DE 10 2011 109 376 A1 describes an actuating device, in the case of which an actuation of the transmission parking lock takes place by transmission oil being supplied into a cylinder cavity of the actuating device. As a result of the supply of transmission oil, a piston arranged in the cylinder is moved, whereby the transmission parking lock is actuated. The supply of the transmission oil into the cylinder cavity of the actuating device is controlled by a parking lock valve which is associated exclusively with the actuating device.

One disadvantage of the known version is that it includes a multitude of components and has a complex design.

The object of the invention is therefore to provide an actuation arrangement which has a simpler design.

SUMMARY OF THE INVENTION

An actuation arrangement according to the invention is of the type mentioned at the outset, which is characterized in that an actuation of the transmission parking lock via the actuating device can be controlled or regulated by the valve, wherein the actuating device actuates the transmission parking lock when the valve assumes the first valve position.

The actuation arrangement according to the invention has the advantage that the actuating device has a simpler design and utilizes fewer components than the known versions. This is the case because there is no longer a need to associate a separate parking lock valve with the actuating device, which has the exclusive function of controlling or regulating the supply of hydraulic oil to the actuating device. In the version according to the invention, a valve is associated with the actuating device, which, in addition to controlling or regulating the supply of transmission oil to the actuating device, is utilized for controlling or regulating a supply of transmission oil to a transmission shift element. The transmission oil supplied to the transmission shift element is utilized for actuating the transmission shift element. In the end, it can be controlled or regulated via the valve whether the transmission shift element not belonging to the actuation arrangement and the transmission parking lock not belonging to the actuation arrangement are actuated.

Yet another advantage of the invention is that the piston is fixable in the engaged position as well as in the disengaged position by the locking unit. The locking unit can also fix the piston in a position other than the engaged position or the disengaged position, of course, or only in the disengaged position. The provision of the locking unit is advantageous because sufficient pressure cannot be exerted by the transmission oil onto the piston in all gears of the vehicle, and therefore an unintentional movement of the piston and, therefore, for example, an unintentional actuation of the transmission parking lock can occur. Due to the locking unit, this unintentional movement of the piston is prevented and the piston is fixed in the engaged position or the disengaged position, i.e., a movement of the piston out of the engaged position into the disengaged position, or vice versa, is prevented.

Within the meaning of the invention, the transmission parking lock is locked when the transmission parking lock prevents an output shaft of the transmission, for example, from rotating. This can be implemented by a parking pawl of the transmission parking lock engaging into a parking interlock gear of the transmission parking lock, which is operatively connected to the output shaft of the transmission, and preventing the output shaft from rotating. Therefore, the output shaft can rotate when the transmission parking lock does not lock and, therefore, the parking pawl does not engage into the parking interlock gear.

The transmission shift element is a clutch or a brake, a form-fit shift element, or a friction-locking shift element. The position of the transmission shift element is changeable by the supply of the transmission oil to the transmission shift element and, therefore, to an actuation of the transmission shift element. In addition, the transmission shift element, together with a gear set, such as a planetary gear set, is usable for providing a gear ratio or "gear." In particular, multiple transmission shift elements and gear sets, such as planetary gear sets, can also be utilized for providing a gear. Through the gear, a defined ratio between an input shaft of the transmission and the output shaft is implemented. The gear is a gear for a forward operation or a reverse operation of the motor vehicle.

Preferably, the actuating device includes a tensioning element, wherein the tensioning element is provided for preloading the piston towards its engaged position. The tensioning element is a spring, for example, a coil spring or a leg spring. The spring is a tension spring or a compression spring.

In one particular version, the piston can divide the cavity into a first cavity, into which the transmission oil can be supplied, and a second cavity, in which the tensioning element is arranged. In this case, the first cavity is fluidically connected to the second line. The tensioning element is operatively connected to the piston. In this case, the tensioning element is a spring which bears, at one end, against a cylinder wall of the cylinder and, at the other end, against the piston. The second cavity is designed such that no transmission oil can be supplied therein.

The piston can be indirectly or directly operatively connected or operatively connectable to the transmission parking lock, such as a parking pawl, by a piston rod. In the end, a simple connection between the actuating device and the transmission parking lock can be implemented.

When transmission oil is supplied into the first cavity, the tensioning element can be tensioned. This results from the fact that, when transmission oil is supplied into the first cavity, the piston is moved into the disengaged position. The tensioning element can exert a force onto the piston in the direction toward the engaged position. In this case, a movement of the piston in the direction toward the engaged position can take place, in particular, when no more oil is present in the first cavity or when the transmission oil is discharged from the first cavity as a result of the movement of the piston in the direction toward the engaged position. The discharge of the transmission oil can take place via a line other than the first line.

In one very particular version, the locking unit is arranged and designed such that, in an operating condition, the locking unit does not prevent a movement of the piston into the engaged position or into the disengaged position. Therefore, the locking unit has at least two operating conditions, namely one operating condition, in which a movement of the piston is not prevented, and another operating condition, in which the locking unit fixes the piston in the engaged position or in the disengaged position. In this case, the locking unit can mechanically fix the piston in the engaged position or in the disengaged position by a re-releasable form-fit and/or friction-locking connection. As a result, a mechanical fixing of the piston and/or the piston rod in the engaged position or disengaged position is achievable in a very particularly simple way. The locking unit can be arranged outside the cavity and/or adjacent to the cylinder.

Very particularly advantageous is a locking unit which includes a movable pin which, in an extended position, abuts against a projection in order to fix the piston. The projection can be arranged on the piston or on the piston rod. In this case, the locking unit can include an actuator which brings about a movement of the pin into the extended position. The actuator can be an electric or hydraulic actuator. In an arrangement of the pin in a retracted position, it is ensured that the piston and/or the piston rod can be moved in the direction toward the engaged position or the disengaged position without the pin abutting against the projection.

In one particular version, in the first valve position of the valve, a supply of the transmission oil to the transmission shift element and into the cavity of the actuating device can take place. In the first valve position, there exists, therefore, a fluidic connection between a third line, which is arranged upstream from the valve, and the first line. In this case, a pump can deliver the transmission oil from a tank into the third line. In an arrangement of the valve in the first valve position, the transmission oil delivered by the pump flows through the valve to the transmission shift element and into the cavity. In addition, the valve can be arranged in a second valve position. In the second valve position, no transmission oil can flow from the third line into the first line. An actuator can transfer the valve from the second valve position into the first valve position, or vice versa. The actuator is an electric and/or hydraulic actuator.

The actuating device is arranged and designed such that transmission oil is supplied to the cavity exclusively by the second line. This means, no further lines are present, through which transmission oil is supplied into the cavity, in particular into the first cavity. In addition, the actuation of the transmission parking lock by the actuating device can be controlled or regulated exclusively by the valve and the locking device. This means, in particular, that no further valves are present, via which, in particular via the valve position of which, the position of the piston can be influenced by supplying transmission oil into the cavity.

In one particular version, a transmission oil flow branched off from the first line into the second line can be supplied directly to the cavity. This means, no further components, such as further valves, are arranged in the area between a connection point of the second line to the first line and the cavity. The connection point can be arranged, in this case, downstream from the valve and upstream from the transmission shift element. In the end, the actuating device is connected in parallel to the transmission shift element.

Of particular advantage is a transmission including the actuation arrangement according to the invention. The transmission includes the transmission parking lock and the transmission shift element. In addition, a motor vehicle including an actuation arrangement or the transmission having the actuation arrangement is advantageous.

BRIEF DESCRIPTION OF THE DRAWINGS

The subject of the invention is schematically represented in the figures and is described in the following. In the drawings, the following is shown.

DETAILED DESCRIPTION

Figure 1:
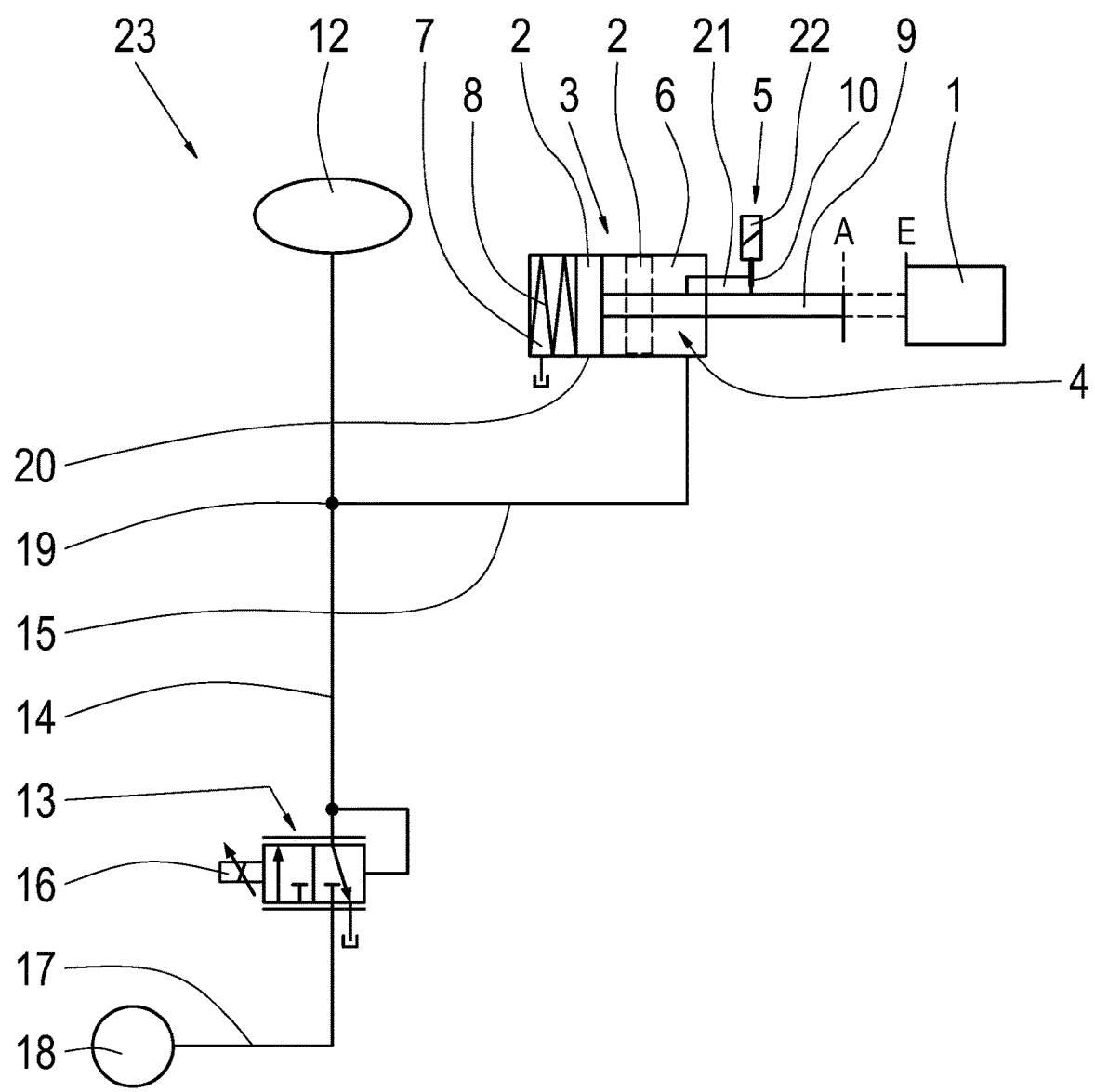
FIG. 1 shows a schematic view of the actuation arrangement according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The actuation arrangement 23 shown in FIG. 1 includes an actuating device for actuating a transmission parking lock 1. In this case, the actuating device includes a piston 2 which is movable into an engaged position E, in which the transmission parking lock 1 locks or is engaged and which is shown in FIG. 1 by a dashed line, and into a disengaged position A, in which the transmission parking lock 1 does not lock or is disengaged. In addition, the actuating device includes a cylinder 3 which includes a cavity 4, in which the piston 2 is arranged and into which transmission oil is suppliable in order to move the piston 2 into the disengaged position A. In addition, the actuating device includes a locking unit 5 which fixes the piston 2 either in the engaged position E or in the disengaged position A or in other positions.

The actuation arrangement 23 also includes a transmission shift element 12, a valve 13, and a first line 14 which fluidically connects the transmission shift element 12 and the valve 13 to each other. The valve 13 is utilized for controlling or regulating a supply of transmission oil to the transmission shift element 12, wherein, when transmission oil is supplied to the transmission shift element 12, said transmission shift element is actuated. In addition, the actuation arrangement 23 includes a second line 15 which is fluidically connected to the first line 14 and to the cavity 4.

Through the valve 13, it is possible to control or regulate whether the transmission parking lock 1 is actuated by the actuating device. Therefore, by the valve 13, it is possible to control or regulate whether the transmission shift element 12 and the transmission parking lock 1 are actuated. The valve 13 has at least two valve positions in this case. In a first valve position, which is not shown in FIG. 1, there is a fluidic connection between the first line 14 and a third line 17 located upstream from the valve 13. The third line 17 is fluidically connected to a pump 18 which delivers transmission oil from a tank which is not shown in the figure. In the end, the transmission oil delivered by the pump can flow through the third line 17 and the valve 13 into the first line 14.

In addition, the valve 13 can have a second valve position which is shown in FIG. 1. In said second valve position, there is no fluidic connection between the first line 14 and the third line 17. By an actuator 16, a selection can be made as to which valve position the valve 13 is to assume.

In an embodiment of the valve 13, in the first valve position, which is not shown, the transmission oil, which has flowed through the valve 13, flows up to a connection point 19 of the second line 15 to the first line 14. There, the transmission oil divides into a transmission oil flow which continues to flow to the transmission shift element 12 and another transmission oil flow which flows into the cavity 4 by the second line 15.

The piston 2 divides the cylinder into a first cavity 6 which is fluidically connected to the second line 15 and a second cavity 7. Arranged in the second cavity 7 is a tensioning element 8 in the form of a spring. The tensioning element 8 bears, at one end, against a cylinder wall 20 and, at the other end, against the piston 2. The piston 2 is connected in a rotationally fixed manner to a piston rod 9. The piston rod 9 is operatively connected to the transmission parking lock 1, wherein the operative connection is not shown in greater detail in FIG. 1. The operative connection is designed such that, for the case in which the piston 2 is arranged in the engaged position E, the transmission parking lock 1 locks and, for the case in which the piston 2 is arranged in the disengaged position A, the transmission parking lock 1 does not lock.

When transmission oil is supplied into the first cavity 6, the piston 2 moves into the disengaged position A and the tensioning element 8 is tensioned. The tensioning element 8 exerts a force onto the piston 2 in the direction toward the engaged position E. The piston 2 moves in the direction toward the engaged position E when the fluid in the first cavity 6 is no longer sufficiently under pressure.

The locking unit 5 includes a pin 10 which is shown in an extended position in FIG. 1. A projection 21 mounted on the piston rod 9 abuts against the pin 10. The pin 10 prevents the piston 2 and the piston rod 9 from moving into the engaged position E. The transfer of the pin 10 into the extended position can be brought about by another actuator 22. Alternatively, the pin 10 can be arranged in a retracted position which is not shown in the figures. In said retracted position, a movement of the piston 2 and the piston rod 9 into the engaged position E or the disengaged position A is not prevented by the locking unit 5.

Figure 2:
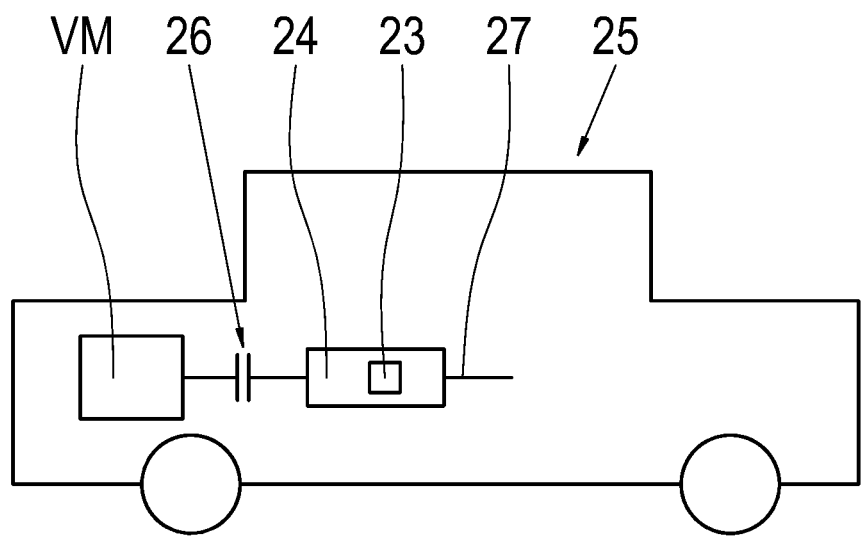
FIG. 2 shows a schematic view of a motor vehicle including a transmission and the actuation arrangement of FIG. 1.

FIG. 2 shows a schematic of a motor vehicle 25 including a transmission 24 which includes the actuation arrangement 23. The motor vehicle 25 includes a motor vehicle drive unit, such as an internal combustion engine VM. The internal combustion engine VM is operatively connectable to the transmission 24 by a clutch 26. The transmission includes a transmission output shaft 27 which is operatively connected to further motor vehicle components which are not shown in the figure.

Modifications and variations can be made to the embodiments illustrated or described herein without departing from the scope and spirit of the invention as set forth in the appended claims.

REFERENCE CHARACTERS 1 transmission parking lock
2 piston
3 cylinder
4 cavity
5 locking unit
6 first cavity
7 second cavity
8 tensioning element
9 piston rod
10 pin
12 transmission shift element
13 valve
14 first line
15 second line
16 actuator
17 third line
18 pump
19 connection point
20 cylinder wall
21 projection
22 other actuator
23 actuation arrangement
24 transmission
25 motor vehicle
26 clutch
27 transmission output shaft
A disengaged position
E engaged position
VM internal combustion engine

The invention claimed is:

1. An actuation arrangement (23), comprising:
a transmission parking lock (1);
an actuating device for actuating the transmission parking lock (1), the actuating device having
 a piston (2) which is movable into an engaged position (E) and a disengaged position (A), the transmission parking lock (1) engaged in the engaged position (E) of the piston (2), the transmission parking lock (1) disengaged in the disengaged position (E) of the piston (2),
 a cylinder (3) including a cavity (4), the piston (2) arranged in the cavity (4), transmission oil suppliable into the cavity (4) to move the piston (2), and
 a locking unit (5) configured for fixing the piston (2) in the engaged position (E) or in the disengaged position (A);
a transmission shift element (12);
a valve (13);
a first line (14) directly fluidically connecting the transmission shift element (12) and the valve (13), the valve (13) having a first valve position, the transmission oil being suppliable to the transmission shift element (12) through the first line (14) to actuate the transmission shift element (12) when the valve (13) is in the first valve position; and a second line (15) fluidically connected to the first line (14), the transmission oil being suppliable into the cavity (4) through the second line (15), wherein actuation of the transmission parking lock (1) via the actuating device is controlled or regulated by the valve (13), and the actuating device actuates the transmission parking lock (1) when the valve (13) is in the first valve position, wherein the transmission shift element (12) is a brake or a clutch.

2. The actuation arrangement (23) of claim 1, further comprising a tensioning element (8) for preloading the piston (2) towards the engaged position (E).

3. The actuation arrangement (23) of claim 2, wherein the piston (2) divides the cavity (4) into a first cavity portion (6), into which the transmission oil is suppliable, and a second cavity portion (7), in which the tensioning element (8) is arranged.

4. The actuation arrangement (23) of claim 3, wherein the tensioning element (8) is tensioned and the piston (2) moves towards the disengaged position (A) when the transmission oil is supplied into the first cavity (6).

5. The actuation arrangement (23) of claim 1, wherein the locking unit (5) does not prevent a movement of the piston (2) into the engaged position (E) or the disengaged position (A) in a retracted position of the locking unit (5).

6. The actuation arrangement (23) of claim 1, wherein the locking unit (5) mechanically fixes the piston (2) in the engaged position (E) or the disengaged position (A) by a releasable form-fit or friction-locking connection in an extended position of the locking unit (5).

7. The actuation arrangement (23) of claim 6, wherein the locking unit (5) includes a movable pin (10), the piston (2) being fixed when the movable pin (10) abuts against a projection (21) of the piston (2).

8. The actuation arrangement (23) of claim 1, wherein a supply of the transmission oil to the transmission shift element (12) and into the cavity (4) takes place in the first valve position of the valve (13).

9. The actuation arrangement (23) of claim 1, wherein:
the transmission oil is suppliable to the cavity (4) exclusively via the second line (15), and
the actuation of the transmission parking lock (1) by the actuating device is controlled or regulated exclusively by the valve (13) and the locking unit (5).

10. The actuation arrangement (23) of claim 1, wherein the transmission oil through the second line (15) is suppliable directly to the cavity (4).

11. The actuation arrangement (23) of claim 1, wherein a connection point (19) of the second line (15) to the first line (14) is arranged downstream from the valve (13) and upstream from the transmission shift element (12).

12. A transmission (24) comprising the actuation arrangement (23) of claim 1.

13. A motor vehicle (25) comprising the actuation arrangement (23) of claim 1.

14. A motor vehicle (25) comprising the transmission (24) of claim 12.

* * * * *